United States Patent
Youn

(10) Patent No.: US 6,710,575 B2
(45) Date of Patent: Mar. 23, 2004

(54) METHOD FOR CONTROLLING A CHARGING STATE OF A BATTERY FOR AN ELECTRIC VEHICLE

(75) Inventor: Kil-Young Youn, Suwon (KR)

(73) Assignee: Hyundai Motor Company, Seoul (KR)

(*) Notice: Subject to any disclaimer, the term of this patent is extended or adjusted under 35 U.S.C. 154(b) by 97 days.

(21) Appl. No.: 10/011,722

(22) Filed: Dec. 11, 2001

(65) Prior Publication Data

US 2002/0084768 A1 Jul. 4, 2002

(30) Foreign Application Priority Data

Dec. 30, 2000 (KR) .................................. 2000-86946

(51) Int. Cl.$^7$ ................................................ H02J 7/00
(52) U.S. Cl. ........................................................ 320/104
(58) Field of Search ................................ 320/104, 132, 320/149, DIG. 18, DIG. 21; 324/427, 429; 340/636.1, 636.15, 455; 429/90, 91; 701/22; 702/63, 64; 290/40 C, 4 R, 4 A, 4 B; 322/10, 16, 17; 180/65.1

(56) References Cited

U.S. PATENT DOCUMENTS

| | | | | | |
|---|---|---|---|---|---|
| 5,081,365 A | * | 1/1992 | Field | ............................ | 290/45 |
| 5,349,535 A | * | 9/1994 | Gupta | .......................... | 702/63 |
| 5,623,194 A | * | 4/1997 | Boll et al. | .................... | 320/137 |
| 5,905,360 A | * | 5/1999 | Ukita | .......................... | 320/118 |
| 5,939,861 A | * | 8/1999 | Joko et al. | ................. | 290/40 R |
| 5,969,624 A | * | 10/1999 | Sakai et al. | .............. | 340/636.1 |
| 6,294,843 B1 | * | 9/2001 | Kato et al. | ................. | 290/40 C |

* cited by examiner

*Primary Examiner*—Pia Tibbits
(74) *Attorney, Agent, or Firm*—Antonelli, Terry, Stout & Kraus, LLP

(57) ABSTRACT

In order to diagnose a fail possibility and to compensate a charging state of a battery of an electric vehicle, by detecting an operating state of a battery while driving a vehicle that is equipped with a rechargeable battery, the present invention provides a method for controlling the charging state of a battery.

3 Claims, 6 Drawing Sheets

Fig.4

| Module No | Voltage value | Count | High / Low voltage or not | Battery state |
|---|---|---|---|---|
|  |  |  |  |  |

METHOD FOR CONTROLLING A CHARGING STATE OF A BATTERY FOR AN ELECTRIC VEHICLE

CROSS-REFERENCE TO RELATED APPLICATION

This application claims priority of Korea patent Application No. 2000-86946, filed on Dec. 30, 2000.

BACKGROUND OF THE INVENTION (a) Field of the Invention

The present invention relates to a method for controlling a charging state of a battery for an electric vehicle, and more particularly to a method for controlling a charging state of a battery of an electric vehicle for diagnosing a failure possibility and for compensating a charging state of the battery, by detecting an operating state of the battery while driving a vehicle that is equipped with a rechargeable battery.

(b) Description of the Related Art

Generally, an electric vehicle and a hybrid electric vehicle are provided with a rechargeable battery that is to be repeatedly charged and discharged.

FIG. 1 illustrates a schematic block diagram of an electric vehicle.

As shown in FIG. 1, an engine 14 generates driving power by using fuel, and the driving power rotates a generator 15. The generator 15 converts the relational power of the engine to electric power, a battery 11 is charged by the electric power, and a motor 13 is driven.

The electric power generated by the generator 15 is charged into the battery after being converted into direct current through a rectifier. The electric power that is generated by the generator 15 or that is outputted by discharge of the battery is delivered to the motor 13 based on control of a motor controller 12, and the vehicle is driven by the rotary power of the motor that is delivered to wheels through a power transmission gear.

A controller 16 detects a state of the motor 13, battery 11, and engine 14, and controls an operating state of the motor controller 12 and generator 15 based on a predetermined pattern.

The controller 16 determines an error condition of the battery when a battery voltage is more than a predetermined critical value or less than another predetermined critical value, while charging or discharging.

Furthermore, the controller 16 determines a battery failure when a voltage difference between a particular battery module and the average voltage of all battery modules exceeds a predetermined value, while charging and discharging.

However, as described above, since the prior art does not determine a battery state but determines only whether the battery is in a normal state or not, it is impossible to compensate for a faulty battery and to determine a cause thereof.

SUMMARY OF THE INVENTION

The present invention provides a method for controlling a charging state, for diagnosing a failure possibility and for compensating for a charging state of a faulty battery of an electric vehicle by detecting an operating state of the battery while driving a vehicle that is equipped with a rechargeable battery.

To achieve the above, the present invention provides a method for controlling the charging state of a battery of an electric vehicle, comprising:

collecting data of the charging state of each battery module and individually storing the collected data by control means, during a charging mode of the battery of a vehicle that is equipped with a rechargeable battery;

collecting data of a charging state of each battery module and individually storing the collected data by control means, in a driving mode of the vehicle; and wherein a data row allotted to each module from storage is detected, displaying a high state for a battery charging state at a predetermined area of the data row corresponding to a battery module having a high voltage in driving mode and in charging mode;

displaying a normal or good state for a battery charging state at the predetermined range of the data row corresponding to a battery module having a high voltage in driving mode and a low voltage in charging mode;

displaying a low state for a battery charging state at the predetermined range of the data row corresponding to a battery module having a low voltage in driving mode and in charging mode, and overcharging the corresponding battery by a predetermined value during the next charging; and displaying a fail possibility state for a battery charging state at the predetermined range of the data row corresponding to a battery module having a low voltage in driving mode and a high voltage in charging mode, and warning of maintenance service of the corresponding battery during the next charging or discharging.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4 illustrates a view of a data row of each battery module;

DETAILED DESCRIPTION OF THE PREFERRED EMBODIMENTS

A preferred embodiment of the present invention will hereinafter be described in detail with reference to the accompanying drawings.

Figure 1:
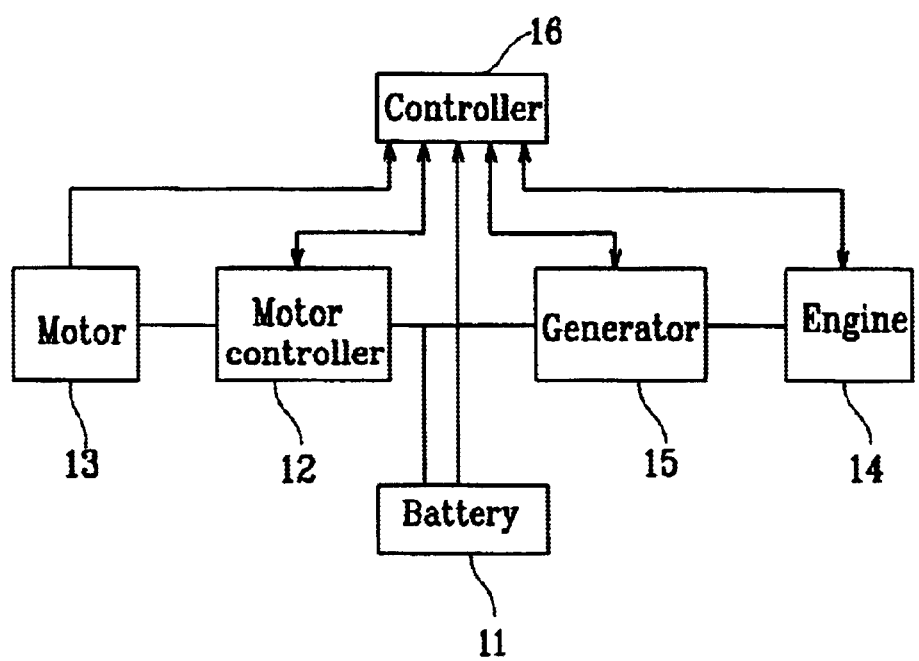
FIG. 1 illustrates a schematic block diagram of a prior art general hybrid electric vehicle.
Figure 2:
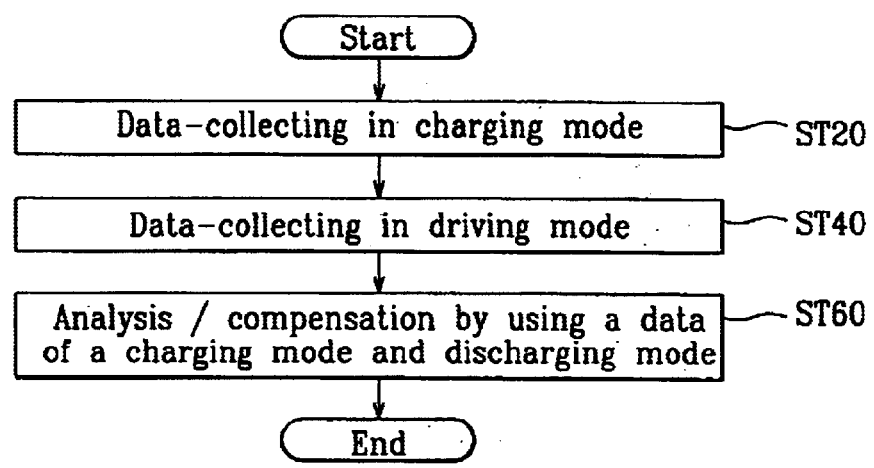
FIG. 2 illustrates a flowchart of a method for controlling a charging state of a battery of an electric vehicle according to a preferred embodiment of the present invention.

As shown in FIG. 2, a control means collects data of the battery during a charging mode at step ST20.

Figure 3:
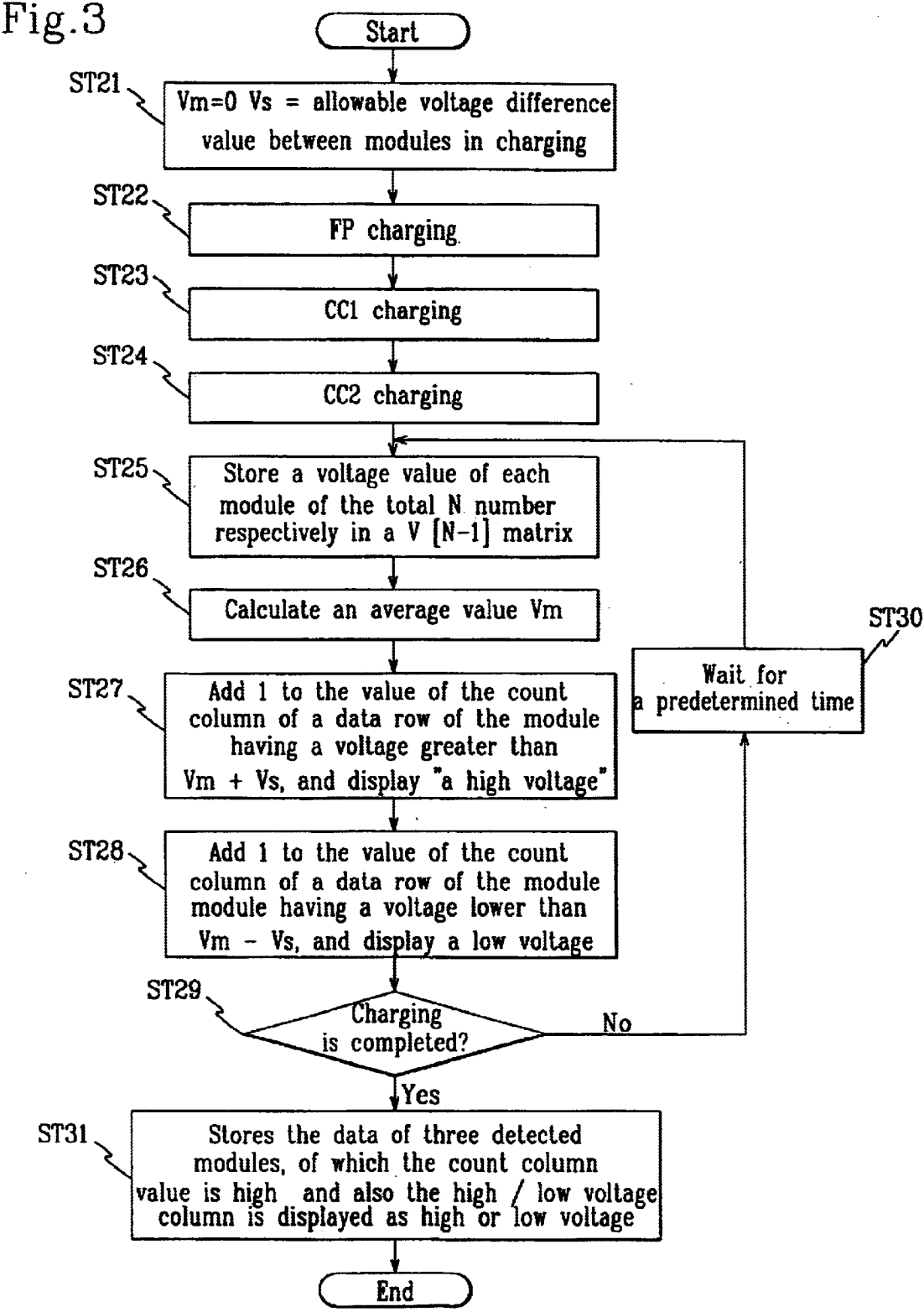
FIG. 3 illustrates a flowchart of a data-collecting step in a charging mode of FIG. 2.

As shown in FIG. 3, in such a charging mode, a data-collecting step of a battery state initiates a variable Vm for storing the voltage value of each battery module (Vm=0), and sets a critical value (Vs) of an allowable voltage difference between the battery modules while charging, at step ST21.

Furthermore, the control means organizes a data row for detecting a module state of each battery, and stores the organized data row in storage, for example in a memory.

As shown in FIG. 4, each data row includes a module number column, a voltage value column, a count column, a high voltage/low voltage column, and a battery state column.

Cells in the module number column are individually allotted to each battery module within the battery, and cells in the voltage value column are individually used for displaying the detected voltage value of the corresponding battery module. The high/low voltage column is used for designating high or low values of the corresponding module voltage, and the battery state column is used for designating an error capability of a battery.

Next, the control means controls performing normal charging on the basis of a charge mode of the battery. Preferably, a normal charge state includes three charge modes, for example, an FP charge mode for charging at the maximum electric power, a CC1 charge mode for charging at a first predetermined current value, and a CC2 charge mode for charging at a second predetermined current. This is shown as steps ST 22 to ST24.

If the charge is performed on the basis of the predetermined charge mode, the control means reads voltage values of each module of the total N modules, and stores them individually in a V [N−1] matrix at step ST25.

Next, the control means sums each voltage value stored in the V [N−1] matrix, calculates an average voltage value of the battery modules by dividing the sum by the number of battery modules, N, and renews the variable Vm as the calculated average voltage value at step ST26.

When the average voltage value is calculated, the control means determines whether there is a battery module having a voltage greater than Vm+Vs. If a battery module having a voltage greater than Vm+Vs is detected, the control means adds 1 to the value of the count column of a data cell of the corresponding module, and displays "a high voltage" in the high/low voltage column at step ST27.

Moreover, the control means determines whether there is a battery module having a voltage lower than Vm−Vs, and if so the control means adds 1 to the value of the count column of a data cell of the corresponding module, and displays "a low voltage" in the high/low voltage column at step ST28.

The control means then determines whether charging is completed, at step ST29.

If charging is not completed at step ST29, the method returns to step ST25 after waiting for a predetermined time. Preferably, the waiting time is set as one minute, at step ST30.

Furthermore, if the charging of the battery is completed at step ST29, the control means reads data of each battery module, stores the data of three modules of which the count column value is detected to be high and the high/low voltage column is displayed as high or low voltage, at step ST31.

As described above, a data-collecting step in the charging mode is performed.

Next, as shown in FIG. 2, the control means collects data in driving mode at step ST40, while the vehicle is driven.

Figure 5:
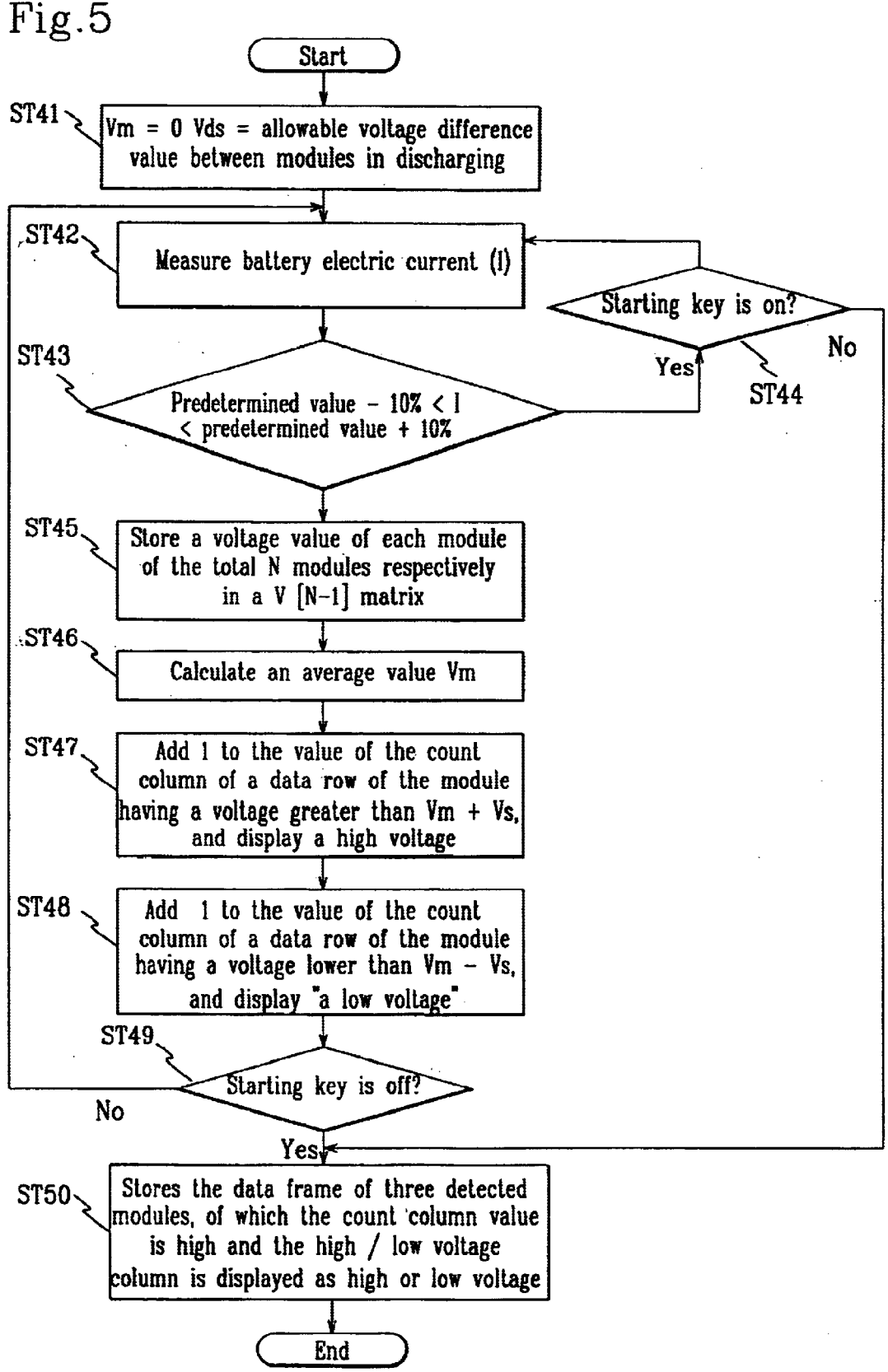
FIG. 5 illustrates a flowchart of a data-collecting step in a driving mode of FIG. 2.

As shown in FIG. 5, in the data-collecting step in driving mode, the control means organizes a data row for each module and initiates the variable Vm for storing an average voltage value, and sets a critical value Vd of the allowable voltage difference between the modules while discharging, at step ST41.

Moreover, the control means measures a discharge electric current value (I) of a battery at step ST42, and it determines whether the measured discharge electric current value (I) falls within a predetermined critical value range at step ST43.

The control means may start data collection in the same state as in a discharge capacity test of a battery in order to minimize the voltage difference based on internal resistance of the battery, by determining whether the measured discharge electric current value falls within the predetermined critical value range. Preferably, a lower limit of the discharge electric current critical range is set as the predetermined value −10%, and an upper limit is set as the predetermined value +10%.

If the detected discharge electric current (I) does not fall within the discharge electric current critical range, the control means determines whether a starting key is at an on state. If a starting key is at an on state, the control means controls step ST43 to return to step ST42 at step ST44.

If the detected discharge electric current valuel falls within the discharge electric current critical range at step ST43, the control means reads a voltage value of each module of the total N modules, and individually stores them in a V [N−1] matrix at step ST45.

Next, the control means calculates an average voltage value Vm by respectively using the voltage values stored in the V [N−1] matrix at step ST46.

After the average voltage value Vm is calculated at step ST46, the control means determines whether there is a battery module having a voltage greater than Vm+Vs. If a battery module having a voltage greater than Vm+Vs is detected, the control means adds 1 to the value of the count cell of the corresponding module, and displays "a high voltage" in the high/low voltage cell at step ST47.

Moreover, if a battery module having a voltage lower than Vm−Vs is detected, the control means controls to add 1 to the value of the count cell of the corresponding module, and displays "a low voltage" in the high/low voltage column at step ST48.

The control means then determines whether a starting key is at an on state by detecting a received signal from an ignition switch at step ST49. If the starting key is at an on state at step ST49, the control means controls returning from step ST49 to step ST42.

On the contrary, if the starting key is at an off state at step ST44 or step ST49, the control means reads data of each battery module, stores the data of three modules of which the count column values are detected to be relatively high, and the high/low voltage column is displayed as high or low voltage, at step ST50.

As described above, the data-collecting step in the driving mode is performed.

Referring to FIG. 2, after the data about the battery state in the charging mode and driving mode of the vehicle are collected, analysis and compensation thereof is performed by using the collected data in the charging and discharging mode of the battery at step ST60.

Figure 6:
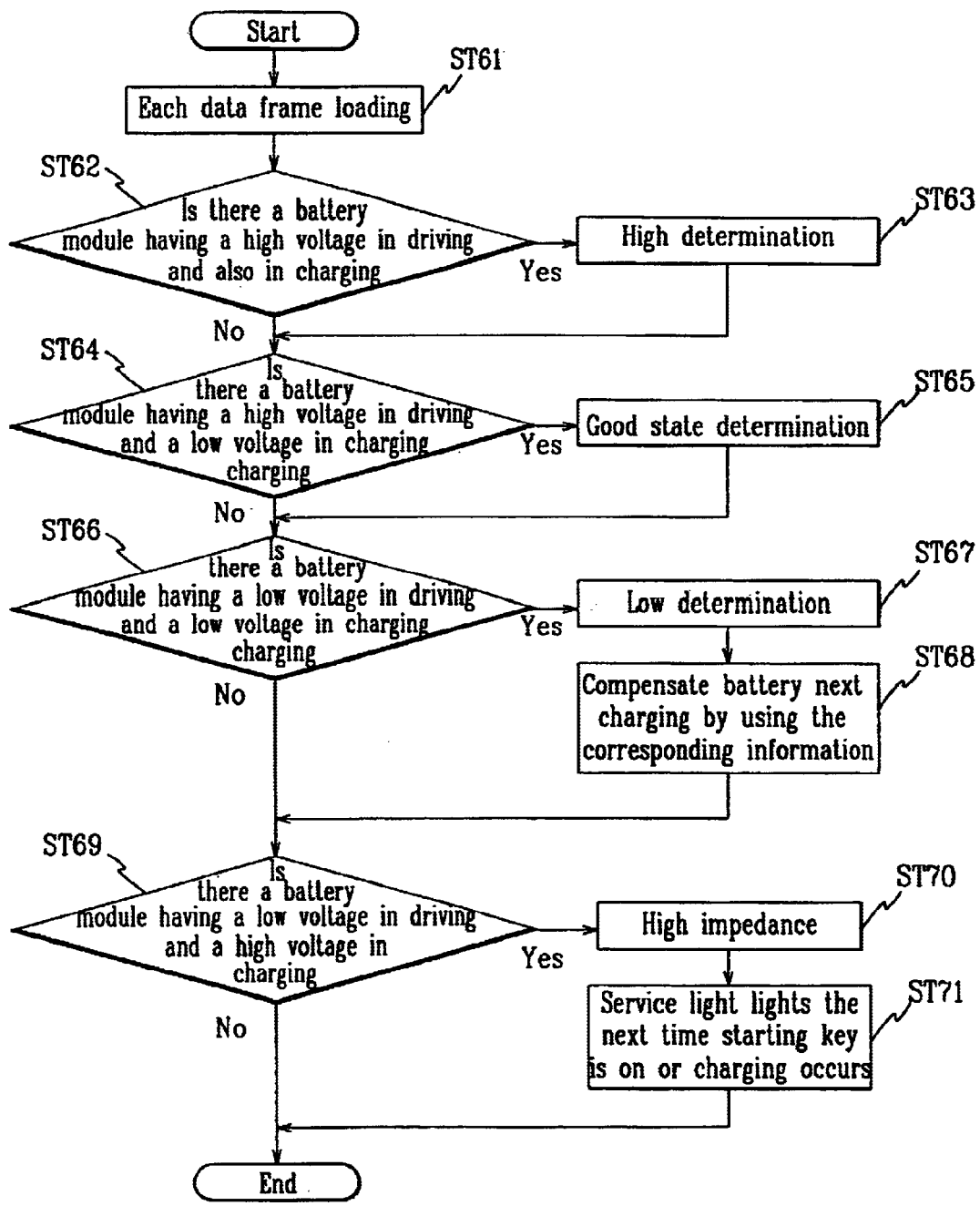
FIG. 6 illustrates a flowchart of an analysis/compensation step by using data of a charging and discharging mode of FIG. 2.

Referring to FIG. 6, in the analysis and compensation step, the control means reads all data cells allotted to each battery module from the storage at step ST61.

Next, the control means determines whether there is a battery module having a high voltage in the driving mode and also in the charging mode, at step ST62.

If the battery module satisfies the condition of step ST62, the control means controls displaying "a high state" for a battery charging state (SOC) at the battery state column within the data cell of the corresponding module at step ST63.

If the battery charging state is displayed as the high state as described above, it means that a charging state of the corresponding battery is extremely good or normal. Therefore, in this case compensation control is not performed separately.

If the battery module does not satisfy the condition of step ST62, or if step ST63 is completed, the control means determines whether there is a battery module having a high voltage at the driving mode and a low voltage at the charging mode, by reading all data cells of each battery module, at step ST64.

Then, if the battery module satisfies the condition of step ST64, the control means controls displaying "a good or normal state" for a battery charging state at the battery state column within the data cell of the corresponding module at step ST65.

Moreover, if the battery module does not satisfy the condition of step ST64, or if step ST64 is completed, the control means determines whether there is a battery module having a low voltage at the driving mode and a low voltage at the charging mode, by reading all data cells of each battery module, at step ST66.

If the battery module satisfies the condition of step ST66, the control means controls to display "a low state" for a battery charging state at the battery state column within the data cell of the corresponding module at step ST67.

The control means then suitably allows charging and compensating of the battery displaying "a low state" when in charging mode thereafter, and it preferably may compensate for the low charging state of the battery by overcharging it by a predetermined value at step ST68.

Moreover, if the battery module does not satisfy the condition of step ST66, or if step ST66 is completed, the control means determines whether there is a battery module having a low voltage at the driving mode and a high voltage at the charging mode, by reading all data cells of each battery module, at step ST69.

If the battery module satisfies the condition of step ST69, the control means controls to display "a high impedance" for a battery charging state at the battery state column within the data cell of the corresponding module at step ST70.

In this case, since the corresponding battery is underperforming and has a failure possibility, the control means controls warning a user of the failure possibility at step ST71, in the next instance when the starting key is in the on state or the battery enters into the charging mode.

As described above, the present invention detects and stores data about a battery state, before determining whether a state of the battery is normal or not. Therefore, the present invention results in increasing a driving distance of a vehicle and preventing acceleration performance from declining, by suitably compensating for a state of the battery on the basis of the data of the battery state.

For example, in the case of failure possibility of the battery, the present invention can compensate a charging state of the battery by using a charger.

Moreover, the present invention results in preventing an increase in maintenance costs and a repair of a driving failure state, because it informs the user to check the corresponding battery, by displaying a failure possibility lamp before a battery failure occurs.

While this invention is described in connection with what is presently considered to be the most practical and preferred embodiment, it is to be understood that the invention is not limited to the disclosed embodiments, but, on the contrary, is intended to cover various modifications and equivalent arrangements included within the sprit and scope of the appended claims.

What is claimed is:

1. A method for controlling a charging state of a battery of an electric vehicle, the battery including a plurality of battery modules, the method comprising:
    (a) collecting data of the charging state of each battery module and individually storing the collected data by control means, during a charging mode of the battery of the vehicle;
    (b) collecting data of the charging state of each battery module and individually storing the collected data by control means, in a driving mode of the vehicle; and
    (c) the charging state of the electric vehicle being controlled by the control means, and comprising detecting a data row allotted to each module from storage, displaying a high state for a battery charging state at a predetermined range of the data row corresponding to a battery module having a high voltage in the driving mode and in the charging mode, displaying a normal or good state for a battery charging state at the predetermined range of the data row corresponding to a battery module having a high voltage in driving mode and a low voltage in charging mode, displaying a low state for a battery charging state at the predetermined range of the data row corresponding to a battery module having a low voltage in the driving mode and in the charging mode, and overcharging the corresponding battery by a predetermined value during a next charging state, and displaying a failure possibility state for a battery charging state at the predetermined range of the data row corresponding to a battery module having a low voltage in the driving mode and a high voltage in charging mode, and warning of maintenance service of the corresponding battery during a next charging or discharging state; and wherein
    (a) step comprises steps carried out by the control means of:
        (a1) setting a critical value of an allowable charging voltage difference between the battery modules during charging, and charging the battery based on a predetermined charging mode;
        (a2) reading a voltage value of each module, individually storing the voltage value of each module, and calculating an average value of the stored voltage values;
        (a3) displaying a predetermined indication at the data row of a corresponding module if a difference between a voltage value of any battery module and the average voltage value is greater than a predetermined critical value of the allowable charging voltage difference value; and
            determining if a charging of the battery is completed; waiting for a predetermined time and then returning to step (a2) if the charging of the battery is not completed; and
            storing a predetermined number of data rows that have the predetermined indication if the charging of the battery is completed.

2. The method of claim 1, wherein the data frame comprises:
    a module number column, cells of which are individually allotted to each battery module within the battery;

a voltage value column for displaying detected voltage values of the corresponding battery modules;

a voltage column for designating high or low voltages of the corresponding modules by comparing a difference between a displayed value of the voltage value column and the average voltage value with the predetermined critical value; and a battery state column for designating fail capability of the battery.

3. A method for controlling a charging state of a battery of an electric vehicle, the battery including a plurality of battery modules, the method comprising:

(a) collecting data of the charging state of each battery module and individually storing the collected data by control means, during a charging mode of the battery of the vehicle;

(b) collecting data of the charging state of each battery module and individually storing the collected data by control means, in a driving mode of the vehicle; and (c) the charging state of the electric vehicle being controlled by the control means, and comprising detecting a data row allotted to each module from storage, displaying a high state for a battery charging state at a predetermined range of the data row corresponding to a battery module having a high voltage in the driving mode and in the charging mode, displaying a normal or good state for a battery charging state at the predetermined range of the data row corresponding to a battery module having a high voltage in the driving mode and a low voltage in charging mode, displaying a low state for a battery charging state at the predetermined range of the data row corresponding to a battery module having a low voltage in the driving mode and in the charging mode, and overcharging the corresponding battery by a predetermined value during a next charging state, and displaying a failure possibility state for a battery charging state at the predetermined range of the data row corresponding to a battery module having a low voltage in the driving mode and a high voltage in the charging mode, and warning of maintenance service of the corresponding battery during a next charging or discharging state; and wherein (a) step comprises steps carried out by the control means of:

(a1) setting a critical value of an allowable charging voltage difference between the battery modules during charging, and charging the battery based on a predetermined charging mode;

(a2) reading a voltage value of each module, individually storing the voltage value of each module, and calculating an average value of the stored voltage values;

(a3) displaying a predetermined indication at the data row of a corresponding module if a difference between a voltage value of any battery module and the average voltage value is greater than a predetermined critical value of the allowable charging voltage difference value; and determining if a charging of the battery is completed;

waiting for a predetermined time and then returning to step (a2) if the charging of the battery is not completed; and storing a predetermined number of data rows that have the predetermined indication if the charging of the battery is completed; and wherein (b) step is carried out by the control means and comprises:

(b1) determining whether a measured discharging electric current of the battery falls within a predetermined discharging electric current range;

(b2) individually storing a voltage value of each battery module if the battery satisfies following within the predetermined discharging electric current range, and calculating an average value of the stored voltage values;

(b3) displaying a predetermined indication at the data row of the corresponding module if a difference between a voltage value of any battery module and the average voltage value is greater than a predetermined critical value of a discharging voltage difference value; and (b4) returning to the (a1) step if driving is not completed, and storing a predetermined displayed data frame only a predetermined number of times if driving is completed.

* * * * *